(12) United States Patent
Greiff et al.

(10) Patent No.: US 8,822,813 B2
(45) Date of Patent: Sep. 2, 2014

(54) SUBMICRON GAP THERMOPHOTOVOLTAIC STRUCTURE AND METHOD

(71) Applicant: MTPV Power Corporation, Austin, TX (US)

(72) Inventors: Paul Greiff, Wayland, MA (US); Robert Dimatteo, Belmont, MA (US); Eric Brown, Cambridge, MA (US); Christopher Leitz, Watertown, MA (US)

(73) Assignee: MTPV Power Corporation, Austin, TX (US)

( * ) Notice: Subject to any disclaimer, the term of this patent is extended or adjusted under 35 U.S.C. 154(b) by 99 days.

(21) Appl. No.: 13/691,104

(22) Filed: Nov. 30, 2012

(65) Prior Publication Data
US 2013/0092212 A1    Apr. 18, 2013

Related U.S. Application Data

(63) Continuation-in-part of application No. 12/152,195, filed on May 12, 2008, now Pat. No. 8,633,373.

(51) Int. Cl.
*H01L 31/058*    (2006.01)
*H01L 31/04*    (2014.01)

(52) U.S. Cl.
CPC ............ *H01L 31/0406* (2013.01); *Y02E 10/50* (2013.01)
USPC ................ 136/253; 136/244; 438/57; 438/80

(58) Field of Classification Search
USPC ............................... 136/253, 244; 438/57, 80
See application file for complete search history.

(56) References Cited

U.S. PATENT DOCUMENTS

| | | | |
|---|---|---|---|
| 4,743,302 A | 5/1988 | Dumesnil et al. | 106/1.23 |
| 6,084,173 A | 7/2000 | DiMatteo | |
| 6,232,546 B1 | 5/2001 | DiMatteo et al. | |
| 2004/0231717 A1 | 11/2004 | Greiff et al. | 136/253 |

OTHER PUBLICATIONS

Micron-Gap ThermoPhotoVoltaic (MTPV), DiMatteo et al, Proceedings of the Fifth TPV Conference, 2002.

*Primary Examiner* — Golam Mowla
(74) *Attorney, Agent, or Firm* — Taylor Russell & Russell, P.C.

(57) ABSTRACT

An improved submicron gap thermophotovoltaic structure and method comprising an emitter substrate with a first surface for receiving heat energy and a second surface for emitting infrared radiation across an evacuated submicron gap to a juxtaposed first surface of an infrared radiation-transparent window substrate having a high refractive index. A second surface of the infrared radiation-transparent substrate opposite the first surface is affixed to a photovoltaic cell substrate by an infrared-transparent compliant adhesive layer. Relying on the high refractive index of the infrared radiation-transparent window substrate, the low refractive index of the submicron gap and Snell's law, the infrared radiation received by the first surface of the infrared radiation-transparent window substrate is focused onto a more perpendicular path to the surface of the photovoltaic cell substrate. This results in increased electrical power output and improved efficiency by the thermophotovoltaic structure.

23 Claims, 6 Drawing Sheets

SUBMICRON GAP THERMOPHOTOVOLTAIC STRUCTURE AND METHOD

This application is a continuation-in-part of prior application Ser. No. 12/152,195 filed on May 12, 2008, which is incorporated herein by reference.

FIELD OF INVENTION

The present invention relates to sub-micrometer gap thermophotovoltaic devices (MTPV) for generating electrical power, wherein a heat source for emitting infrared radiation is spaced from a photovoltaic cell surface by a gap preferably of less than one micrometer (hereinafter sometimes referred to as micron or submicron gaps). This configuration obviates the far-field limitation of Planck's Law and allows the system to function as though its black body emissivity were greater than unity and thereby achieving photocurrents many times greater those obtained in conventional far-field thermophotovoltaic cells, as described in U.S. Pat. Nos. 6,084,173 and 6,232,546, and the paper entitled "Micron-gap Thermo Photo Voltaic (MTPV)", DiMatteo et al., Proceedings of the Fifth TPV Conference, 2002, all incorporated herein by reference. The present invention is more particularly concerned with the novel interposition of an infrared-transmitting window having a relatively high index of refraction between a submicron gap and a photovoltaic cell which convert the incoming photon radiation to electricity and improvements resulting from this configuration.

BACKGROUND

To avoid thermal shorting, the MTPV system disclosed herein is preferably operated in a vacuum enclosure or housing which enables an evacuated gap and gap spacers to be employed to set the gap between the infrared radiation emitter and the photovoltaic cell receiver in a manner which minimizes heat transfer through the spacers. The gap spacers may be fabricated, for example, of silicon dioxide. Phonons or non-radiated energy carriers are a source of inefficiency. Unlike photons, phonons transfer energy from the source but they do not have the individual energy to excite electrons across the submicron gap.

As described in the above referenced paper, a method of forming the spacers used to set the gap between the hot infrared radiation emitter and the photovoltaic cell substrate is to grow a thick oxide on the infrared radiation emitter and form the oxide through such methods as photolithography and plasma etching into cylindrical spacers. These spacers which have a flange on an end are formed are formed in such a manner that the thermal path is about 15 microns long although the spacers only protrude less than a micron above the emitting surface. This allows setting a sub-micron gap while minimizing parasitic heat transfer through the spacers to the photovoltaic cell.

In the prior art, the back surface of the photovoltaic cell is used as the mating surface with the infrared radiation emitter to form the sub-micron gap. A disadvantage of this configuration is that it places stringent demands on the photovoltaic cell. For example, most photovoltaic cells are front illuminated and cannot readily be designed flat enough to permit a submicron gap to be formed with the surface. The prior art arrangement shown in FIG. 1 also precludes other options as will be described in enumerating the advantages of the present invention.

There is a need for a more facile, less complicated and less costly structure and method of fabrication of a submicron gap thermophotovoltaic device.

SUMMARY

It is an object of the present invention to provide a new configuration of thermal infrared radiation emitters and photovoltaic cells that is not subject to the limitations described above and others of the prior art. Another object of the present invention is provide an improved configuration that relies on the use of transparent windows that are affixed to photovoltaic cells and have a high index of refraction for directing an increased amount of thermal radiation from an infrared radiation emitter in the near field to the photovoltaic cells. The invention embraces a thermophotovoltaic structure enclosed in an evacuated housing that includes an infrared radiation emitter with formed spacers to maintain a submicron gap separation from a high index of refraction window that is transparent to thermal radiation from the infrared radiation emitter. The high index of refraction window may be compliantly affixed to a photovoltaic cell and provides a focusing effect to direct increased thermal radiation to the photovoltaic cell from a juxtaposed infrared radiation emitter across a preferably evacuated sub-micron gap.

BRIEF DESCRIPTION OF THE DRAWINGS

These and other features, aspects and advantages of the present invention will become better understood with regard to the following description and accompanying drawings wherein.

DETAILED DESCRIPTION

Figure 1:
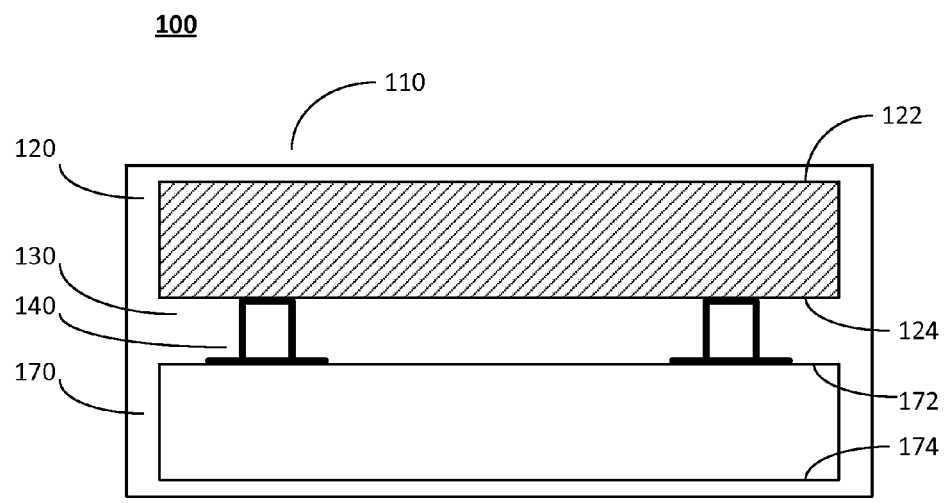
FIG. 1 depicts a cross-sectional view of a near field thermophotovoltaic device according to the prior art.

Referring to the FIG. 1, FIG. 1 depicts a cross-sectional view of a near field thermophotovoltaic device 100 according to the prior art. The prior art thermophotovoltaic device 100 includes an infrared radiation emitter substrate 120 juxtaposed from a photovoltaic cell substrate 170 and separated by a submicron gap 130. A plurality of spacers 140 are fabricated on the infrared radiation emitter substrate 120 and positioned between the infrared radiation emitter substrate 120 and the photovoltaic cell substrate 170 to maintain the submicron gap 130. The device 100 includes the infrared radiation emitter substrate 120, the submicron gap 130, the photovoltaic cell substrate 170 and a plurality of spacers 140 enclosed in a preferably evacuated housing 110 for maintaining a vacuum in the submicron gap 130 thereby providing enhanced infrared radiation transfer between the infrared radiation emitter substrate 120 and the photovoltaic cell substrate 140. The infrared radiation emitter substrate 120 includes a first surface 122 for receiving thermal energy from a heat source and a second surface 124 for emitting infrared radiation across the submicron gap 130 to a first surface 172 of the photovoltaic cell substrate 170. The photovoltaic cell substrate 170 also includes a second surface 174 where electrical connection may be available. While conventional thermophotovoltaic systems involve conversion of infrared radiation emitted by a blackbody into electricity via the use of photovoltaic cells, submicron gap thermophotovoltaic systems utilize a preferably submicron evacuated gap between an infrared radiation emitter and the photovoltaic cell to achieve enhanced radiative transfer as compared to conventional far-field thermovoltaic systems. Although the near field configuration of prior art devices is a very compact design, the compactness is achieved at the expense of flexibility.

Figure 2:
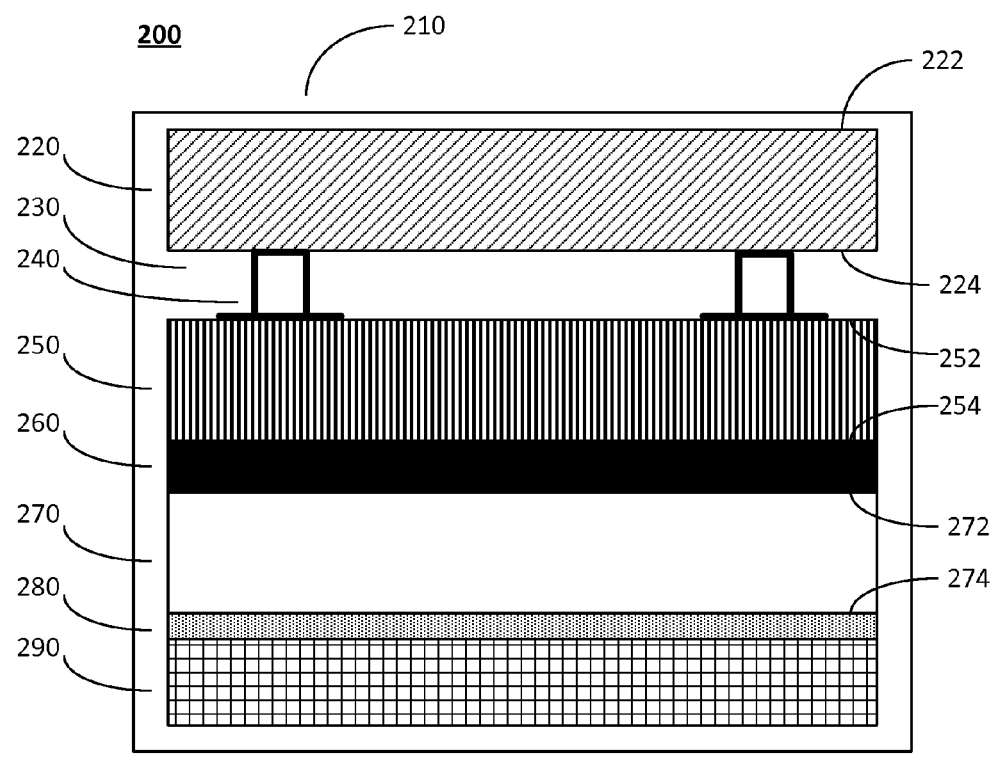
FIG. 2 is a cross-sectional view of an embodiment of a single device according to the structure disclosed and claimed herein.
Figure 3:
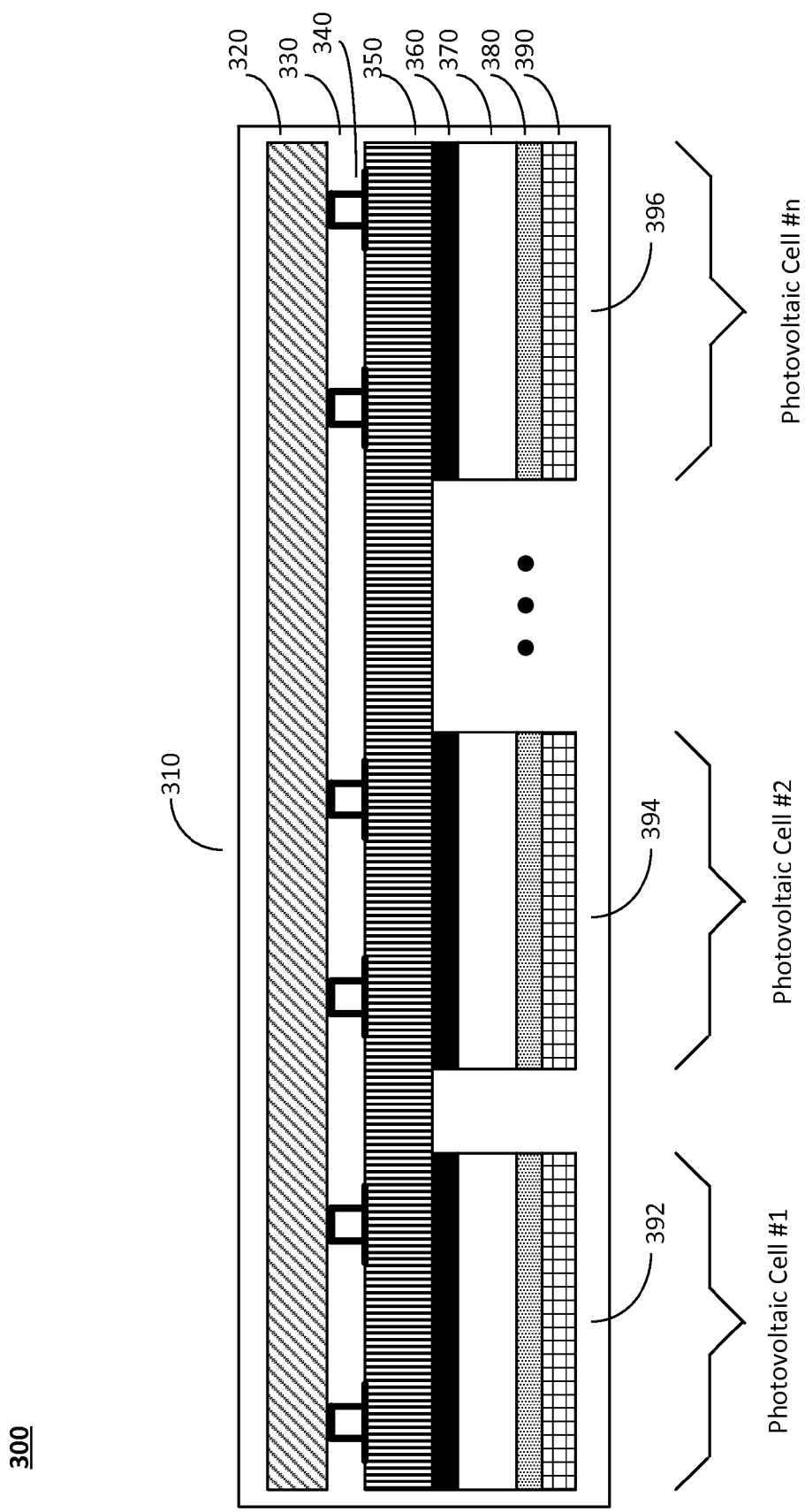
FIG. 3 depicts a configuration where a plurality of photovoltaic cells as shown in FIG. 2 are irradiated through a single large infrared-transparent window substrate juxtaposed across a submicron gap from a single large infrared radiation emitter substrate.

Referring to FIG. 2, FIG. 2 is a cross-sectional view of a device 200 according to an embodiment disclosed and claimed herein. This embodiment, as illustrated in FIG. 2, is enclosed in an evacuated enclosure 210 and includes a radiation emitter substrate 220, a submicron gap 230, an infrared transparent window substrate 250, an infrared-transparent compliant adhesive layer 260 and a photovoltaic cell substrate 270. This embodiment 200 solves problems inherent in the prior art by utilizing an intermediate window substrate 250 that is transparent to infrared radiation, has a high index of refraction and is positioned between a first surface 272 of the photovoltaic cell substrate 270 and the submicron gap 230. A second surface 224 of the infrared radiation emitter substrate 220 is juxtaposed opposite a first surface 252 of the intermediate infrared-transparent window substrate 250 across the submicron gap 230 formed between the infrared radiation emitter substrate 220 and the intermediate infrared-transparent window substrate 250. The photovoltaic cell substrate 270, or alternatively a plurality of photovoltaic cell substrates as shown in FIG. 3, is shown positioned onto a second surface 254 of the infrared-transparent window substrate 250 opposite the submicron gap 230. The infrared-transparent window substrate 250 may be affixed to the first surface 272 of the photovoltaic cell substrate 270 by an infrared-transparent compliant adhesive layer 260.

The infrared-transparent window substrate 250 has a high refractive index, preferably equal to or greater than the refractive index of the infrared radiation emitter substrate 220 and the photovoltaic cell substrate 270. The infrared-transparent window substrate materials may include single crystalline semi-insulating gallium arsenide (GaAs), single crystalline semi-insulating Indium Phosphide (InP), float-zone or lightly doped silicon (Si). All of these infrared-transparent window substrate materials have refractive indexes of greater than 3.0 at infrared wavelengths. The refractive index for a vacuum and air is 1.0.

The device 200 shown in FIG. 2 according to the embodiment disclosed and claimed herein has increased flexibility over the prior art and enables certain advantages subsequently disclosed. It provides a separation of functions necessary for fabrication of a submicron gap 230 and achieves an increase in the amount of emitted photons from the infrared emitter substrate 220 impinging on the photovoltaic cell substrate 270. This is accomplished by incorporating a separate receiving surface 252 of the infrared-transparent window substrate 250 across the submicron gap 230 from the second surface 224 of the infrared radiation emitter substrate 220 rather than relying on a first surface 272 of a photovoltaic cell substrate 270. Further increase in photons impinging the first surface 272 of the photovoltaic cell substrate 270 is achieved by inserting a high index of refraction infrared-transparent substrate 250 between the receiving surface 252 of the infrared-transparent window substrate 250 adjacent the submicron gap 230 and the first surface 272 of one or more photovoltaic cell substrates 270.

The embodiment shown in FIG. 2 utilizes a first surface 222 of an infrared radiation emitter substrate 220 for receiving heat energy and spacers 240 similar to those shown in the prior art of FIG. 1 for maintaining a submicron gap 230 between the infrared radiation emitter substrate 220 and the infrared-transparent window substrate 250. In this embodiment, the spacers 240 are fabricated as part of the infrared radiation emitter 220, and comprise the same material as the infrared radiation emitter 220, or derived therefrom. Instead of relying on a first surface 272 of a photovoltaic cell substrate 270 for receiving photons from the infrared radiation emitter substrate 220, a minimally processed infrared-transparent window substrate 250 is used to form a surface 252 for the near field submicron gap 230 for extracting photons from the infrared radiation emitter substrate 220. A high index of refraction window material is used as a light pipe to focus and conduct photons from the receiving surface 252 of the infrared-transparent window substrate 250 to the first surface 272 of the photovoltaic cell 270. A second surface 274 of the photovoltaic cell substrate 270 provides for electrical connections 280 to the photovoltaic cell substrate 270 on a heat sink 290 or a plurality of photovoltaic cells mounted on a common heat sink. A high index of refraction is required of the infrared-transparent compliant adhesive layer 260 in order to minimize reflection losses at the first surface 272 of the photovoltaic cell 270. Optical elastomers or chalcogenide glasses are examples of suitable materials for the infrared-transparent compliant adhesive layer 260. Any material used should have a high transparency at infrared wavelengths. The degree of enhancement achieved in the near field is proportional to the square of the lowest index of refraction material used for creating the gap. If a silicon infrared radiation emitter is used, then the window material is optimally silicon as well. Silicon wafers are available in very large diameters and can be obtained free of particulate matter. In contrast to the rigid photovoltaic cell requirements of the prior art, the use of an infrared-transparent window substrate 250 with the photovoltaic cell substrate 270 as disclosed in the present specification enables the photovoltaic cell substrate 270 to be illuminated on the metallized junction side and a plurality of photovoltaic cell substrates can be used without having to match the thickness of the cells to a very exacting degree. Taken to an extreme, different types of photovoltaic cells may be used together. Minor particulate contamination of the photovoltaic cells is no longer significant. The combination of a large area construct and lower requirements on the photovoltaic cells enable a lower cost of manufacture.

As noted above, the infrared-transparent compliant adhesive layer 260 should also preferably exhibit a high refractive index of greater than 1.4 and preferably greater than 2.0, and high transmission at infrared wavelengths. Suitable material for infrared-transparent compliant adhesive layer 260, for the purpose of present invention, include epoxies, filled elastomers, solder glasses such as those containing lead oxide, and chalcogenide glasses. Chalcogenide glasses are amorphous solid materials, composed of such elements as germanium, selenium, tellurium, arsenic, indium, sulfur, and antimony. They are preferable because of their high refractive indices, high infrared transmission, and low softening points. The adhesive material of layer 260 preferably also exhibits some compliancy, as mentioned previously.

In some embodiments of the invention, the material of the infrared-transparent compliant adhesive layer 260 may serve a dual function, both as the previously described adhesive to adhere or hold the photovoltaic cell substrate 270 to the infrared-transparent window substrate 250, and also as a material to provide for up-conversion of incoming photons. Up-conversion involves the use of low energy photons to promote electrons in a material up one or more energy levels. When the electron relaxes to a lower energy state, it emits a photon of a higher energy. These up-conversion layers may be used to tailor the incoming infrared light spectrum to the photovoltaic cell. Typically, they are formed via introduction of rare earth compounds or ions, based on such elements as yttrium or erbium, into the material of the infrared-transparent compliant adhesive layer 260. Alternately, up-conversion can be achieved through incorporation of semiconductor quantum dots into the material of infrared-transparent compliant adhesive layer 260.

FIG. 3 depicts a configuration 300 where a plurality of photovoltaic cells 392, 394, 396 are irradiated through a single large infrared-transparent window substrate 350 juxtaposed across a submicron gap 330 from a single large infrared radiation emitter substrate 320. The single large infrared radiation emitter substrate 320 is heated by thermal energy from an external source and transmits infrared photons across the submicron gap 330 to the single large infrared-transparent window substrate 350, where the submicron gap 330 is maintained by spacers 340 attached to the single large infrared radiation emitter substrate 320. Similarly to the description of FIG. 2 above, each of the plurality of photovoltaic cell 392, 394, 396 includes an infrared-transparent compliant adhesive layer 360, a photovoltaic cell substrate 370, electrical connections 380 and heat sinks 390. The entire device is contained in an evacuated enclosure 310. As described above, advantages of this configuration include a plurality of cells that can be used without having to match the thickness of the cells to a very exacting degree. Taken to an extreme, different types of photovoltaic cells may be used together. Minor particulate contamination of the photovoltaic cells is no longer significant. The combination of a large area construct and lower requirements on the photovoltaic cells enable a lower cost of manufacture.

Figure 4:
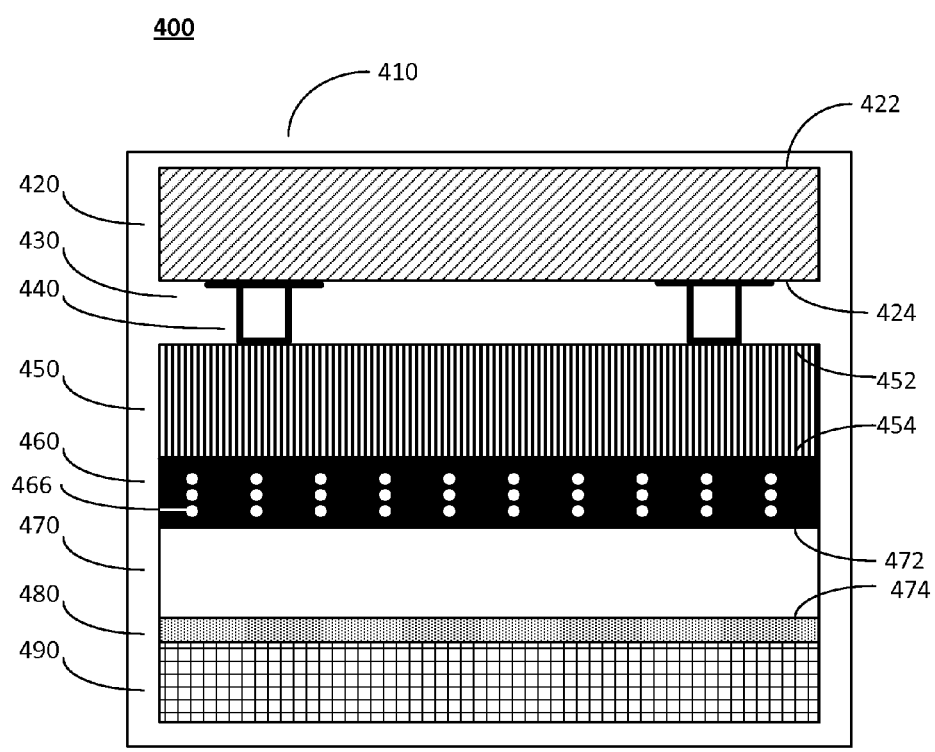
FIG. 4 is a cross-sectional view of an alternative embodiment of a single device according to the structure disclosed and claimed herein.

Referring to FIG. 4, FIG. 4 is a cross-sectional view of an alternative embodiment 400 of a device according to the structure disclosed and claimed herein. This embodiment, as illustrated in FIG. 4, is enclosed in an evacuated enclosure 410 and includes an infrared radiation emitter substrate 420 that receives thermal radiation from an external source on a first surface 422. The infrared radiation emitter substrate 420 transmits infrared photons across a submicron gap 430 to an infrared-transparent window substrate 450, which is affixed to a photovoltaic cell substrate 470 by an infrared-transparent compliant adhesive layer 460. Similar to FIG. 2, this embodiment, as illustrated in FIG. 4, solves problems inherent in the prior art by utilizing an intermediate window substrate 450 transparent to infrared radiation having a high index of refraction positioned between a first surface 472 of the photovoltaic cell substrate 470 and the submicron gap 430, where a second surface 424 of the infrared radiation emitter substrate 420 is juxtaposed with a first surface 452 of the infrared-transparent window substrate 450 across the submicron gap 430 formed between the infrared radiation emitter substrate 420 and the infrared-transparent window substrate 450. The photovoltaic cell substrate 470 is shown positioned onto a second surface 454 of the infrared-transparent window substrate 450 opposite the submicron gap 430. The infrared-transparent window substrate 450 may be affixed to the first surface 472 of the photovoltaic cell substrate 470 by the infrared-transparent compliant adhesive layer 460.

Although similar to the structure described above in relation to FIG. 2, in this embodiment, spacers 440 are fabricated as part of the infrared-transparent window substrate 450 rather than a part of the infrared radiation emitter substrate 420, but serve to maintain the submicron gap 430. This provides a number of significant advantages. Because the receiving infrared-transparent window substrate 450 is a part of the cold side of the near field as opposed to the hot side infrared radiation emitter substrate 420, the spacers 440 are not dragged laterally when the infrared radiation emitter substrate 420 is brought to temperature, thus minimizing the chance of damaging or breaking the spacers 440. Thus, since the infrared radiation emitter substrate 420 can be fabricated from a larger variety of materials, it is possible to use a material that is more stable at higher temperatures for allowing a significant increase in operating temperature and resulting power generation. For example, selecting a material having selective radiation properties for the infrared radiation emitter substrate 420 such as tungsten silicide enables deposition on a refractory substrate such as alumina or zirconia. Selective emission enables greater efficiency in a near field process by minimizing emissions in the long wavelength low energy portion of the infrared spectrum. It is also possible in the near field to coat the surfaces forming the submicron gap 430 with a higher refractive index material and thereby increasing the power generation for a given gap width. This is another advantage of having greater freedom to select the material for the infrared radiation emitter substrate 420. Another advantage of this disclosed structure is that spacers 440 formed on a single infrared-transparent window substrate 450 may provide a substantially uniform submicron gap 430 between the infrared radiation emitter substrate 420 and plurality photovoltaic cell substrates 470, as described below. As noted above in relation to FIG. 2, up-conversion can be achieved through incorporation of semiconductor quantum dots 466 into the adhesive material layer 460.

Similar to that described above in relation to FIG. 2, the infrared-transparent window substrate 450 has a high refractive index, preferably equal to or greater than the refractive index of the infrared radiation emitter substrate 420 and the photovoltaic cell substrate 470. The infrared-transparent window substrate materials may include single crystalline semi-insulating gallium arsenide (GaAs), single crystalline semi-insulating Indium Phosphide (InP), float-zone or lightly doped silicon (Si). All of these infrared-transparent window substrate materials have refractive indexes of greater than 3.0 at infrared wavelengths. The refractive index for a vacuum and air is 1.0.

The device 400 shown in FIG. 4 according to the embodiment disclosed and claimed herein has increased flexibility over the prior art and enables certain advantages subsequently disclosed. It provides a separation of functions necessary for fabrication of a submicron gap 430 and achieves an increase in the amount of emitted photons from the infrared emitter substrate 420 impinging on the photovoltaic cell substrate 470. This is accomplished by incorporating a separate receiving surface 452 of the infrared-transparent window substrate 450 across the submicron gap 430 from the second surface 424 of the infrared radiation emitter substrate 420 rather than relying on a first surface 472 of a photovoltaic cell substrate 470. Further increase in photons impinging the first surface 472 of the photovoltaic cell substrate 470 is achieved by inserting a high index of refraction infrared-transparent substrate 450 between the receiving surface 452 of the infrared-transparent window substrate 450 adjacent the submicron gap 430 and the first surface 472 of one or more photovoltaic cell substrates 470.

Instead of relying on a first surface 472 of a photovoltaic cell substrate 470 for receiving photons from the infrared radiation emitter substrate 420, a minimally processed infrared-transparent window substrate 450 is used to form a surface 452 for the near field submicron gap 430 for extracting photons from the infrared radiation emitter substrate 420. A high index of refraction window material is used as a light pipe to focus and conduct photons from the receiving surface 452 of the infrared-transparent window substrate 450 to the first surface 472 of the photovoltaic cell 470. A second surface 474 of the photovoltaic cell substrate 470 provides for electrical connections 480 to the photovoltaic cell substrate 470 on a heat sink 490 or a plurality of photovoltaic cells mounted on a common heat sink. A high index of refraction is required of the infrared-transparent compliant adhesive layer 460 in order to minimize reflection losses at the first surface 472 of the photovoltaic cell 470. Optical elastomers or chalcogenide glasses are examples of suitable materials for the infrared-transparent compliant adhesive layer 460. Any material used should have a high transparency at infrared wavelengths.

Figure 5:
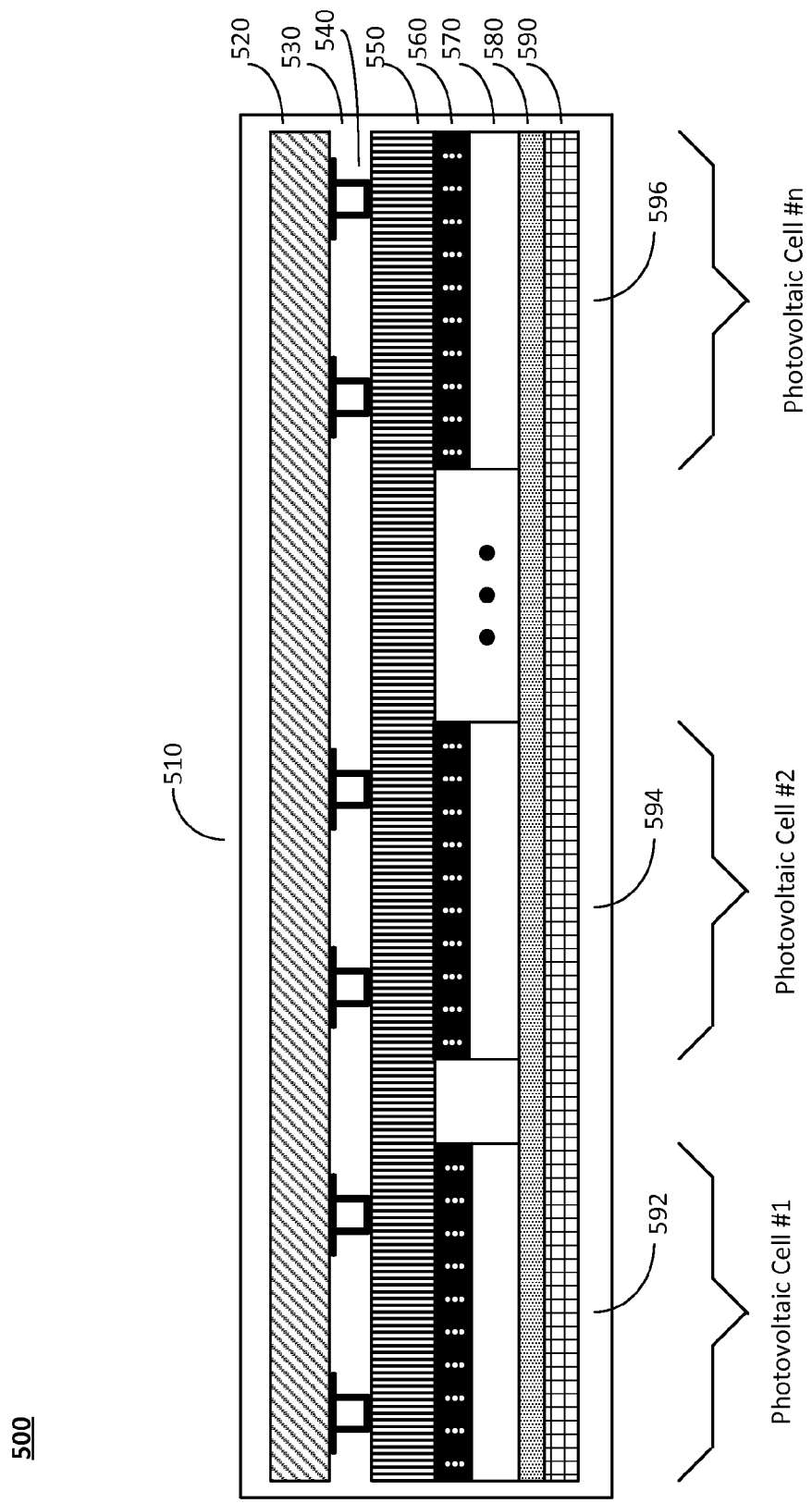
FIG. 5 depicts a configuration where a plurality of photovoltaic cells as shown in FIG. 4 are irradiated through a single large infrared-transparent window substrate juxtaposed across a submicron gap from a single large infrared radiation emitter substrate.

FIG. 5 depicts a configuration 500 where a plurality of photovoltaic cells 592, 594, 596 are irradiated through a single large infrared-transparent window substrate 550 juxtaposed across a submicron gap 530 from a single large infrared radiation emitter substrate 520. The single large infrared radiation emitter substrate 520 is heated by thermal energy from an external source and transmits infrared photons across the submicron gap 530 to the single large infrared-transparent window substrate 550, where the submicron gap 530 is maintained by spacers 540 attached to the single large infrared radiation emitter substrate 520. Similarly to the description of FIG. 4 above, each of the plurality of photovoltaic cell 592, 594, 596 includes an infrared-transparent compliant adhesive layer 560 and a photovoltaic cell substrate 570. Common electrical connections 580 are provided between the photovoltaic cells 592, 594, 596 and a common heat sink 590 provides for cooling. The entire device is contained in an evacuated enclosure 510. As described above, advantages of this configuration include a plurality of cells that can be used without having to match the thickness of the cells to a very exacting degree. Use of the infrared-transparent window substrate 550 enables illumination of either a metallized alumina side or a side opposite therefrom, either of which may have a geometry that is unsuitable for formation of a submicron gap 530. Taken to an extreme, different types of photovoltaic cells may be used together. Minor particulate contamination of the photovoltaic cells is no longer significant. The combination of a large area construct and lower requirements on the photovoltaic cells enable a lower cost of manufacture.

Figure 6:
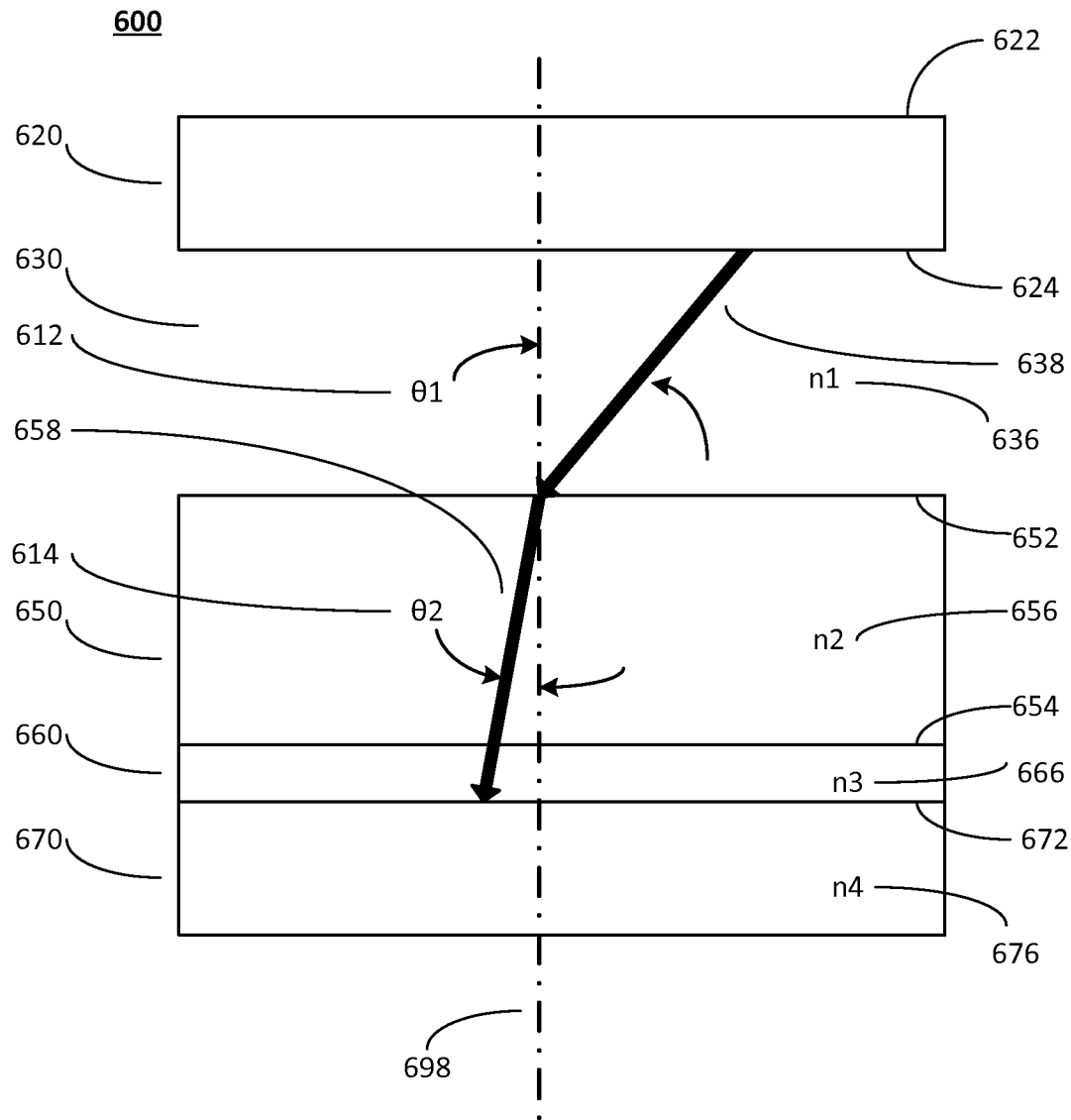
FIG. 6 is a depiction of the focusing effect on infrared radiation from an infrared radiation emitter substrate when it enters a high index of refraction infrared radiation-transparent window substrate from an evacuated submicron gap.

Referring to FIG. 6, as disclosed above in relation to FIG. 2 through FIG. 5, an infrared radiation-transparent window substrate 650 is disclosed having a high index of refraction 656 for improved collection and near-field transmission of submicron gap infrared energy 638 from a the second surface 624 of the infrared radiation emitter substrate 620 across a near-field submicron gap 630 to a first surface 652 of the infrared radiation-transparent window substrate 650. The first surface 652 of the infrared radiation-transparent window substrate 650 is juxtaposed from the second surface 624 of the infrared radiation emitter substrate 620 for receiving broadband infrared radiation 638 from the second surface 624 of the infrared radiation emitter substrate 620. The first surface 622 of the infrared emitter substrate 620 receives thermal energy from an external source. As disclosed above, the infrared radiation-transparent window substrate 650 is selected from, but not limited to, the group consisting of single crystalline semi-insulating gallium arsenide (GaAs), single crystalline semi-insulating indium phosphide (InP), float-zone or lightly doped silicon (Si). All these window materials exhibit a refractive index 656 of greater than 3.3 at infrared radiation wavelengths (see e.g., http://refractiveindex.info/). The refractive index 636 for a vacuum and air in the near-field submicron gap 630 is 1.0.

Since infrared radiation emanating from the second surface 624 of the infrared radiation emitter substrate 620 is isotropic, all infrared radiation 638 emitted by the second surface 624 of the infrared radiation emitter substrate 620 across the near-field submicron gap 630 does not impinge first surface 652 of the infrared radiation-transparent substrate 650 at right angles and, subsequently, the first surface 672 of the photovoltaic cell substrate 670 at normal or right angles. A distinctive mechanism inherent in invention disclosed herein is the reliance on a high refractive index 656 of the infrared radiation-transparent window substrate 650, the high index of refraction 666 of the infrared-transparent compliant adhesive layer 660, the high index of refraction 676 of the photovoltaic cell substrate 676 and the operation of Snell's law to substantially reduce the angles of incidence within the substrates 650, 660, 670. For example, the angle of incidence 612 of broadband infrared radiation 638 that impinges the first surface 652 of the infrared radiation-transparent window substrate 650 to a substantially smaller angle 614 for the broadband infrared radiation 658 exiting the first surface 652 of the infrared radiation-transparent window substrate 650 as window radiation 658 closer to a normal or ninety degree angle 698 to the substrate surfaces 624, 652, 672 when the broadband infrared radiation 658 exits the second surface 654 of the infrared radiation-transparent window substrate 650. A similar improvement in an angle of impingement of the broadband infrared radiation 658 at the first surface 654 of the infrared-transparent compliant adhesive layer 660 and the first surface 672 of the photovoltaic cell substrate 670 due to the high refractive indices 666, 676 of the infrared-transparent compliant adhesive layer 660 and the photovoltaic cell substrate 670. This infrared broadband radiation 658 is carried through the infrared-transparent compliant adhesive layer 660 and received at the first surface 672 of the photovoltaic cell 670. By directing the radiation 658 impinging on the first surface 672 of the photovoltaic cell substrate 670 to arrive at an angle closer to a normal or ninety degree angle of incidence greatly increases the collection efficiency of impinging broadband infrared radiation 658 on the photovoltaic cell substrate 670. As noted above the radiation-transparent window substrate 460 has a refractive index of greater than 3.0, and a vacuum or air micron gap has a refractive index of 1.0. The operation of this mechanism is described briefly below in relation to FIG. 6.

The high refractive index 656 of the infrared radiation-transparent window substrate 650 also provides maximum enhancement of black body radiation received in the near field from the infrared radiation emitter substrate 620. The high refractive indices 656, 666, 676 of the substrates 650, 660, 670 also minimize reflection losses and maintain a nearly perpendicular flow of radiation 658 through all subsequent substrates 650, 660, 670.

Referring to FIG. 6, FIG. 6 is a depiction of the focusing effect on thermal radiation 638 from the second surface 624 of the infrared radiation emitter substrate 620 when it enters the high index of refraction infrared radiation-transparent window substrate 650 from an evacuated submicron gap 630. FIG. 6 depicts refraction of impinging radiation 638 at a first angle θ1 of incidence 612 from the second surface 624 of the infrared radiation emitter substrate 620 across the submicron gap 630 to the first surface 652 of the infrared radiation-transparent window substrate 650. The submicron gap 630 has a refractive index 636 of N1 and the infrared radiation-transparent window substrate 650 has a refractive index 656 of N2. The radiation 658 exits the first surface 652 of the infrared radiation-transparent window substrate 650 into the body of the infrared radiation-transparent window substrate 650 at a second angle θ2 of incidence 614. The angles θ1 and θ2 may be calculated using Snell's law:

$$N1 \sin θ1 = N2 \sin θ2, \text{ or}$$

$$θ2 = [\sin^{-1}(N1 \sin θ1)]/N2, \text{ where } N2 > N1$$

As an example, using the numbers above for refractive indices of the sub-micron gap 630 of 1.0 and infrared radiation-transparent window substrate 650 of 3.3, the values of various angles θ1 and θ2 may be calculated.

Therefore, for example, if θ1 is 30°, θ2=8.7°. The exiting angle of incidence θ2 is reduced to 29% of the original first impinging angle of incidence θ1. This results in an incident angle of the radiation impinging the first surface 672 of the photovoltaic cell substrate 670 from the radiation-transparent window substrate 650 closer to a normal or ninety degree angle 698 to the substrate surfaces 624, 652, 672 which increases the collection efficiency of the photovoltaic cell 670 resulting in improved efficiency of electrical power generation.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. Further modifications will also occur to those skilled in this art, and such are considered to fall within the spirit and scope of the invention as defined in the appended claims.

The invention claimed is:

1. A submicron gap thermophotovoltaic structure for improved generation of electrical power, the structure comprising:
   an infrared radiation emitter substrate having an external first surface for receiving energy from a heat source and an opposing internal second surface in juxtaposition with a first surface of an infrared radiation-transparent window substrate across a submicron gap;
   the infrared radiation-transparent window substrate having a high refractive index and a second surface opposing the first surface, the second surface being affixed to a first surface of a photovoltaic cell substrate by an infrared-transparent compliant adhesive layer having a high refractive index;
   the photovoltaic cell substrate receiving increased infrared radiation focused on the photovoltaic cell substrate due to the difference of the low refractive index of the submicron gap and the high refractive indices of the infrared radiation-transparent window substrate and the infrared-transparent compliant adhesive layer; and
   increased electrical power output and improved efficiency by the submicron gap thermophotovoltaic structure provided by the high refractive indices of the substrates and the difference of the refractive indices of the substrates and the near field submicron gap.

2. The structure of claim 1, further comprising the high refractive index of the infrared radiation-transparent window substrate for maximizing enhancement of the black body radiation.

3. The structure of claim 1, further comprising the high refractive indices of the substrates for minimizing reflection losses and maintaining a more perpendicular radiation flow through the substrate.

4. The structure of claim 1, wherein the second surface of the infrared radiation-transparent window substrate is affixed to first surfaces of a plurality of photovoltaic cell substrates by an infrared-transparent compliant adhesive layer.

5. The structure of claim 4, further comprising an electrical interconnection layer and a thermal heat sink substrate affixed to second surfaces of the plurality of photovoltaic cell substrates.

6. The structure of claim 4, wherein a single infrared radiation-transparent substrate provides a substantially uniform gap for a plurality of photovoltaic cells.

7. The structure of claim 1, wherein the infrared radiation-transparent window substrate and the infrared radiation-transparent compliant adhesive layer have refractive indices of greater than 3.0 at infrared wavelengths.

8. The structure of claim 1, whereby the infrared radiation-transparent window substrate is selected from the group consisting of single crystalline semi-insulating gallium arsenide (GaAs), single crystalline semi-insulating indium phosphide (InP), float-zone (Si) and lightly doped silicon (Si).

9. The structure of claim 1, wherein the infrared radiation-transparent window substrate is a single crystal wafer with overall flatness of maintaining uniform gap spacing over a large area.

10. The structure of claim 1, wherein the submicron gap is evacuated.

11. The structure of claim 1, wherein the structure is enclosed in an evacuated housing.

12. The structure of claim 1, wherein the infrared radiation-transparent compliant adhesive layer is compliant and has a high index of refraction at infrared wavelengths.

13. The structure of claim 1, wherein the infrared-transparent compliant adhesive layer provides up-conversion of low-energy incoming photons.

14. The structure of claim 1, further comprising spacers for maintaining substantially uniform submicron gap spacing selected from the group consisting of spacers fabricated on the infrared radiation emitter substrate internal second surface and spacers fabricated on the infrared radiation-transparent window substrate first surface.

15. The structure of claim 1, wherein the photovoltaic cell substrate is illuminated on a second surface opposing the first surface by infrared radiation.

16. A method for improved generation of electrical power with a submicron gap thermophotovoltaic structure, comprising:
   receiving heat energy from a heat source by an external first surface of an infrared radiation emitter substrate;
   transmitting infrared radiation across a submicron gap by an internal second surface opposing the first surface of the infrared emitter substrate, the opposing internal second surface being in juxtaposition with a first surface of an infrared radiation-transparent window substrate across a submicron gap having a low refractive index;
   receiving infrared radiation by the first surface of the infrared radiation-transparent window substrate at impinging radiation angles relative to an angle perpendicular to the first surface of the infrared radiation-transparent window substrate, the infrared radiation-transparent window substrate having a high refractive index;

relying on the difference of the refractive indices, focusing the received infrared radiation by the first surface of the infrared radiation-transparent window substrate to substantially reduced radiation angles within the infrared radiation-transparent substrate relative to the impinging radiation angles and an angle perpendicular to the first surface of the infrared radiation-transparent window substrate;

the infrared radiation exiting a second surface of the infrared radiation window substrate opposite the first surface of the infrared radiation-transparent window substrate at the substantially reduced radiation angles relative to the impinging radiation angles and an angle perpendicular to the first surface of the infrared radiation-transparent window substrate, the second surface of the infrared radiation-transparent window substrate being affixed to a first surface of a photovoltaic cell substrate by an infrared radiation-transparent compliant adhesive layer having a high refractive index;

receiving increased infrared radiation on the first surface of the photovoltaic cell substrate due to the substantially reduced radiation angle relative to the impinging radiation angles and an angle perpendicular to the first surface of the infrared radiation-transparent window substrate; and increasing electrical power output and improving efficiency of the submicron gap thermophotovoltaic structure provided by the high refractive indices of the substrates and the difference of the refractive indices of the substrates and the near field submicron gap.

17. The method of claim 16, further comprising maximizing enhancement of the black body radiation by the high refractive index of the infrared radiation-transparent window substrate.

18. The method of claim 16, further comprising minimizing reflection losses and maintaining a more perpendicular radiation flow through the substrate by the high refractive indices of the substrates.

19. The method of claim 16, wherein the method includes affixing the second surface of the infrared radiation-transparent window substrate to first surfaces of a plurality of photovoltaic cell substrates by an infrared-transparent compliant adhesive layer.

20. The method of claim 19, further comprising affixing an electrical interconnection layer and a thermal heat sink substrate to second surfaces of the plurality of photovoltaic cell substrates.

21. The method of claim 16, further comprising evacuating the submicron gap.

22. The method of claim 16, further comprising fabricating spacers for maintaining substantially uniform submicron gap spacing selected from the group consisting of fabricating spacers on the infrared radiation emitter substrate internal second surface and fabricating spacers on the infrared radiation-transparent window substrate first surface.

23. The method of claim 16, wherein the receiving increased infrared radiation on the first surface of the photovoltaic cell substrate comprises receiving increased infrared radiation on the second surface of the photovoltaic cell substrate.

* * * * *